(12) United States Patent
Kurata et al.

(10) Patent No.: US 11,441,580 B2
(45) Date of Patent: Sep. 13, 2022

(54) SOLENOID VALVE SYSTEM

(71) Applicant: SMC CORPORATION, Chiyoda-ku (JP)

(72) Inventors: Toshinori Kurata, Tsukubamirai (JP); Hiroshi Kubo, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 288 days.

(21) Appl. No.: 16/732,406

(22) Filed: Jan. 2, 2020

(65) Prior Publication Data

US 2020/0224680 A1 Jul. 16, 2020

(30) Foreign Application Priority Data

Jan. 11, 2019 (JP) .............................. JP2019-003043

(51) Int. Cl.
| | |
|---|---|
| F15B 1/26 | (2006.01) |
| F15B 13/02 | (2006.01) |
| F16K 27/00 | (2006.01) |
| F16K 31/06 | (2006.01) |

(52) U.S. Cl.
CPC .............. *F15B 1/26* (2013.01); *F15B 13/021* (2013.01); *F16K 27/003* (2013.01); *F16K 31/06* (2013.01); *F15B 2211/427* (2013.01)

(58) Field of Classification Search
CPC ......... Y10T 137/2589; Y10T 137/2635; Y10T 137/2544; Y10T 137/7761; Y10T 137/0396
See application file for complete search history.

(56) References Cited

U.S. PATENT DOCUMENTS

| | | | | |
|---|---|---|---|---|
| 6,338,358 | B1* | 1/2002 | Watanabe | G05D 16/2093 137/102 |
| 8,847,103 | B2* | 9/2014 | Retnaswamy | B23K 9/013 219/121.55 |
| 9,624,947 | B2* | 4/2017 | Burgett | G05B 19/045 |
| 2002/0036013 | A1* | 3/2002 | Inayama | G05D 16/2024 137/487.5 |
| 2003/0070710 | A1* | 4/2003 | Inayama | G05D 16/2095 137/85 |
| 2013/0118595 | A1* | 5/2013 | Neef | F16K 47/04 137/12 |
| 2015/0211552 | A1 | 7/2015 | Burgett et al. | |

FOREIGN PATENT DOCUMENTS

| | | |
|---|---|---|
| EP | 2 592 519 A1 | 5/2013 |
| JP | 2005-157644 A | 6/2005 |

OTHER PUBLICATIONS

Extended European Search Report dated Apr. 23, 2020 in European Patent Application No. 201504289, 8 pages

* cited by examiner

*Primary Examiner* — Robert K Arundale
(74) *Attorney, Agent, or Firm* — Oblon, McClelland, Maier & Neustadt, L.L.P.

(57) ABSTRACT

A solenoid valve system includes a supply solenoid valve, a plurality of exhaust solenoid valves, and a valve control section controlling opening and closing operation of the supply solenoid valve and the plurality of exhaust solenoid valves using PWM or PFM. The plurality of exhaust solenoid valves are disposed in parallel with each other. The supply solenoid valve and the plurality of exhaust solenoid valves have substantially identical flow rate characteristics. The number of the plurality of the exhaust solenoid valves is twice the number of the supply solenoid valve.

5 Claims, 13 Drawing Sheets

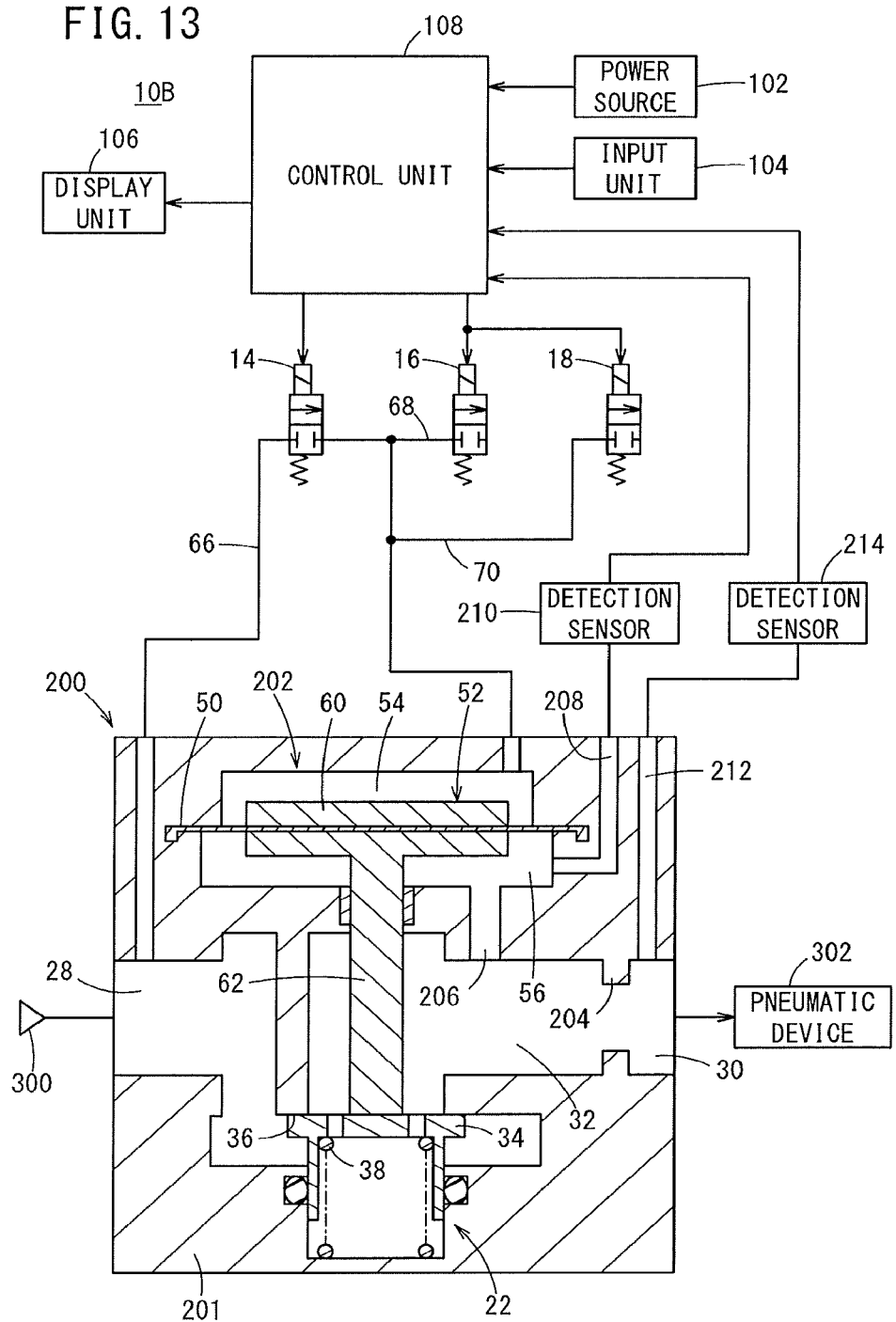

SOLENOID VALVE SYSTEM

CROSS-REFERENCE TO RELATED APPLICATION

This application is based upon and claims the benefit of priority from Japanese Patent Application No. 2019-003043 filed on Jan. 11, 2019, the contents of which are incorporated herein by reference.

BACKGROUND OF THE INVENTION

Field of the Invention

The present invention relates to solenoid valve systems.

Description of the Related Art

Japanese Laid-Open Patent Publication No. 2005-157644 discloses a solenoid valve system including a supply valve element opening and closing a supply channel that places an inlet port and an outlet port in communication and a pilot valve portion for operating the supply valve element. The solenoid valve system includes one supply solenoid valve controlling the flow rate of gas supplied to a pilot chamber of the pilot valve portion and one exhaust solenoid valve controlling the flow rate of gas exhausted from the pilot chamber. The opening and closing operation of the supply solenoid valve and the exhaust solenoid valve is controlled using PWM or PFM control.

SUMMARY OF THE INVENTION

In such a solenoid valve system, the supply solenoid valve and the exhaust solenoid valve are preferably identical to each other (have substantially identical flow rate characteristics) to reduce the cost. In this case, however, the maximum exhaust amount in the control period of the exhaust solenoid valve is less than the maximum supply amount in the control period of the supply solenoid valve.

Consequently, the number of opening and closing operation of the exhaust solenoid valve (the number of times the exhaust solenoid valve is operated) is greater than the number of opening and closing operation of the supply solenoid valve (the number of times the supply solenoid valve is operated) in the solenoid valve system. As a result of extensive research, the inventors found that the number of times the exhaust solenoid valve is operated is twice the number of times the supply solenoid valve is operated. Thus, the exhaust solenoid valve has shorter life than the supply solenoid valve in the solenoid valve system. When the exhaust solenoid valve has reached its end of life, the whole solenoid valve system needs to be replaced.

The present invention has been devised taking into consideration the aforementioned problems, and has the object of providing a solenoid valve system with reduced cost and longer life.

According to an aspect of the present invention, a solenoid valve system includes a supply valve element opening and closing a supply channel that places an inlet port and an outlet port in communication, a pilot valve portion configured to operate the supply valve element, a supply solenoid valve configured to control a flow rate of gas supplied to a pilot chamber of the pilot valve portion, a plurality of exhaust solenoid valves configured to control a flow rate of gas exhausted from the pilot chamber, and a valve control section configured to control opening and closing operation of the supply solenoid valve and the plurality of exhaust solenoid valves using PWM or PFM control, wherein the plurality of exhaust solenoid valves are disposed in parallel with each other, the supply solenoid valve and the plurality of exhaust solenoid valves have substantially identical flow rate characteristics, and a number of the plurality of exhaust solenoid valves is twice a number of the supply solenoid valve.

According to the present invention, the supply solenoid valve and the plurality of exhaust solenoid valves have the substantially identical flow rate characteristic. This enhances the common use of parts and thus leads to a reduction in the cost of the solenoid valve system. In addition, since the number of the plurality of exhaust solenoid valves is twice the number of the supply solenoid valve, the number of times the exhaust solenoid valves are operated can be efficiently reduced. This reduces difference in life between the exhaust solenoid valves and the supply solenoid valve, and thus extends the life of the solenoid valve system.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 13 is a schematic view of a solenoid valve system according to a second embodiment of the present invention.

DESCRIPTION OF THE PREFERRED EMBODIMENTS

Preferred embodiments of a solenoid valve system according to the present invention will be described in detail below with reference to the accompanying drawings.

First Embodiment

Figure 1:
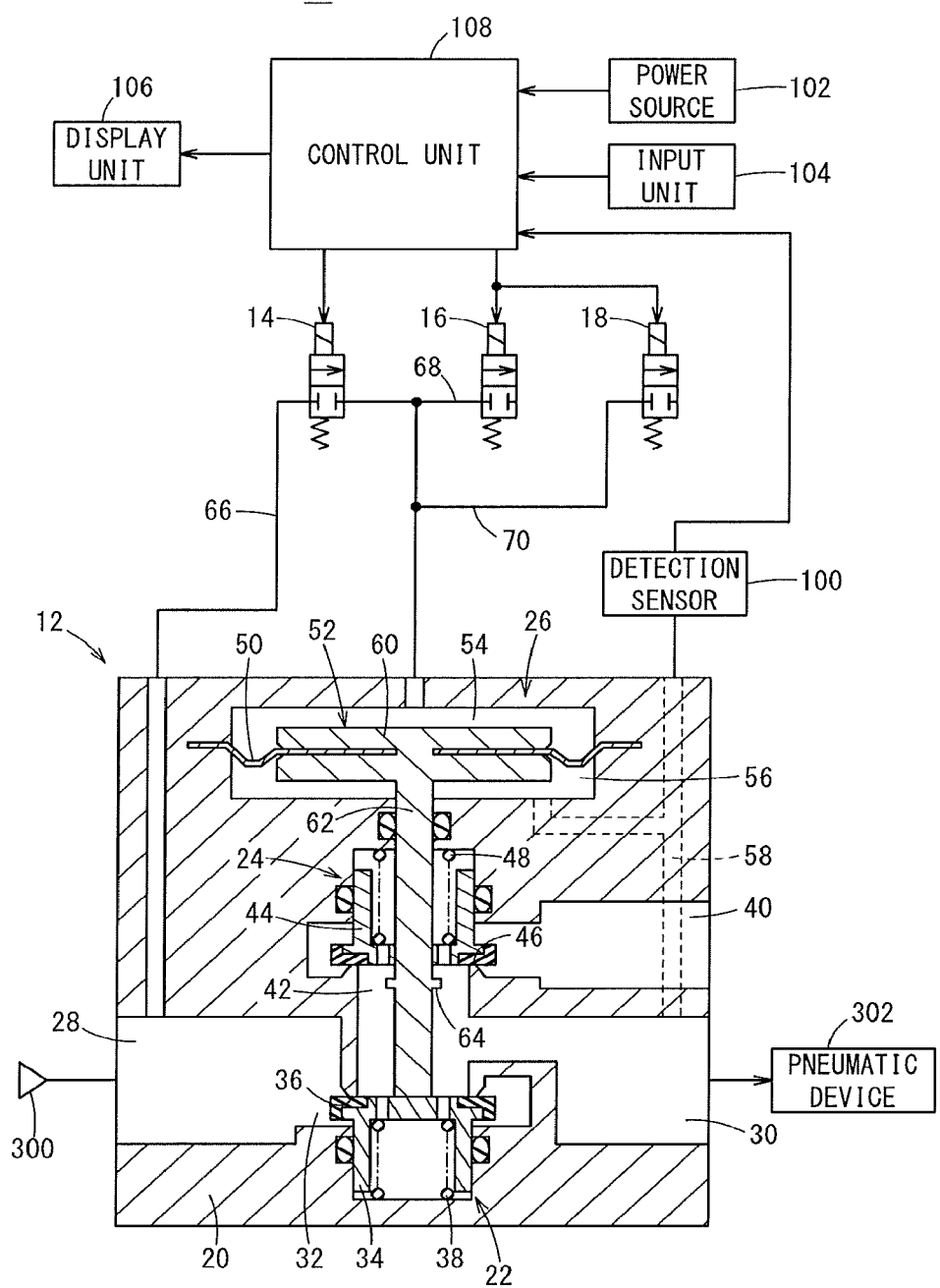
FIG. 1 is a schematic view of a solenoid valve system according to a first embodiment of the present invention.

A solenoid valve system according to a first embodiment of the present invention illustrated in FIG. 1 is used as, for example, an electro-pneumatic regulator that controls pressure applied to a pneumatic device 302 based on input signals.

As illustrated in FIG. 1, a solenoid valve system 10A includes a valve unit 12, a supply solenoid valve 14, a first exhaust solenoid valve 16, and a second exhaust solenoid valve 18. The valve unit 12 includes a valve body 20, a supply valve portion 22, an exhaust valve portion 24, and a pilot valve portion 26. The valve body 20 has a supply channel 32 placing an inlet port 28 and an outlet port 30 in communication. A gas supply source 300 for supplying compressed gas (for example, compressed air) is connected to the inlet port 28. The pneumatic device 302 is connected to the outlet port 30.

The supply valve portion 22 opens and closes the supply channel 32. Specifically, the supply valve portion 22 includes a supply valve element 34 disposed inside the supply channel 32, a supply valve seat 36 on which the supply valve element 34 is seated, and a supply valve biasing member 38 biasing the supply valve element 34 toward the supply valve seat 36.

The supply valve element 34 is biased by the supply valve biasing member 38 in a direction such that the supply valve element 34 normally closes the channel. The supply valve seat 36 is disposed on a wall portion forming the supply channel 32. The supply valve biasing member 38 includes, but not limited to, a coiled compression spring.

The valve body 20 has an exhaust channel 42 for placing a part of the supply channel 32 on a downstream side of the supply valve seat 36 and an exhaust port 40 in communication. The exhaust port 40 is exposed to the atmosphere.

The exhaust valve portion 24 is aligned with the supply valve portion 22 in the direction along which the supply valve biasing member 38 biases the supply valve element 34. The exhaust valve portion 24 opens and closes the exhaust channel 42. Specifically, the exhaust valve portion 24 includes an exhaust valve element 44 disposed inside the exhaust channel 42, an exhaust valve seat 46 on which the exhaust valve element 44 is seated, and an exhaust valve biasing member 48 biasing the exhaust valve element 44 toward the exhaust valve seat 46.

The exhaust valve element 44 is biased by the exhaust valve biasing member 48 in a direction such that the exhaust valve element 44 normally closes the channel. The exhaust valve seat 46 is disposed on a wall portion forming the exhaust channel 42. The biasing direction of the exhaust valve biasing member 48 is opposite to the biasing direction of the supply valve biasing member 38. The exhaust valve biasing member 48 includes, but not limited to, a coiled compression spring.

The pilot valve portion 26 is configured to operate the supply valve element 34 and the exhaust valve element 44 and is disposed in the valve body 20. The pilot valve portion 26 includes a diaphragm 50 and a valve element operating part 52 attached to the diaphragm 50.

The diaphragm 50 partitions a predetermined space formed in the valve body 20 into a pilot chamber 54 and a back pressure chamber 56. The back pressure chamber 56 communicates with the outlet port 30 via a middle channel 58 formed in the valve body 20. The valve element operating part 52 includes a secured part 60 secured to the central part of the diaphragm 50 and a rod 62 extending from the secured part 60 to the supply valve portion 22 through the exhaust valve portion 24.

The extended end of the rod 62 is in contact with the supply valve element 34. The rod 62 pushes the supply valve element 34 in a direction opposite to the biasing direction of the supply valve biasing member 38. An engagement protrusion 64 is provided for the rod 62 between the supply valve portion 22 and the exhaust valve portion 24 to be engaged with the exhaust valve element 44. The engagement protrusion 64 pushes the exhaust valve element 44 in the direction opposite to the biasing direction of the exhaust valve biasing member 48.

The supply solenoid valve 14 opens and closes a communication channel 66 placing the inlet port 28 and the pilot chamber 54 in communication. The supply solenoid valve 14 controls the flow rate of gas supplied to the pilot chamber 54.

The first exhaust solenoid valve 16 opens and closes a first release channel 68 connected to the communication channel 66. The second exhaust solenoid valve 18 opens and closes a second release channel 70 connected to the communication channel 66. The first exhaust solenoid valve 16 and the second exhaust solenoid valve 18 are disposed in parallel with each other. The first exhaust solenoid valve 16 and the second exhaust solenoid valve 18 each control the flow rate of gas exhausted from the pilot chamber 54.

In this embodiment, the solenoid valve system includes two exhaust solenoid valves (the first exhaust solenoid valve 16 and the second exhaust solenoid valve 18) for one supply solenoid valve 14. That is, the number of the exhaust solenoid valves is twice the number of the supply solenoid valve 14.

Figure 2:
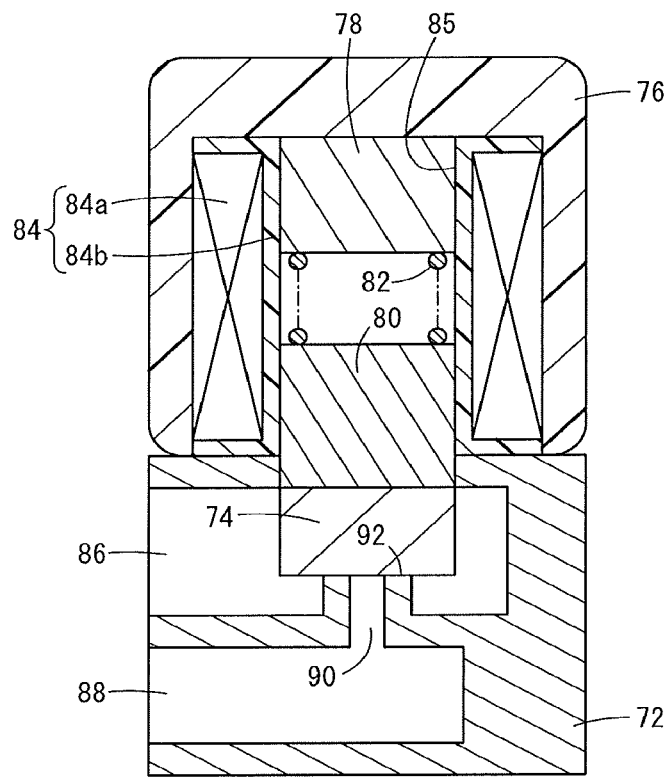
FIG. 2 is a cross-sectional view of a supply solenoid valve (a first exhaust solenoid valve and a second exhaust solenoid valve)

As illustrated in FIG. 2, the supply solenoid valve 14 includes a valve body 72, a poppet valve 74, a housing 76, a fixed core 78, a movable core 80, a biasing member 82, and a solenoid portion 84. The valve body 72 has a channel 90 placing an input port 86 and an output port 88 in communication. The poppet valve 74 opens and closes the channel 90. Specifically, the poppet valve 74 is disposed inside the channel 90 to be seated on a valve seat 92 provided for a wall portion forming the channel 90.

The housing 76 is disposed on the valve body 72 to accommodate the fixed core 78, the movable core 80, the biasing member 82, and the solenoid portion 84. The solenoid portion 84 includes a coil 84a and a bobbin 84b around which the coil 84a is wound. The bobbin 84b has an inner hole 85 in which the fixed core 78 and the movable core 80 are disposed.

The fixed core 78 is secured to the housing 76. The movable core 80 is secured to the poppet valve 74 coaxially with the fixed core 78. The movable core 80 slides on the inner surface of the bobbin 84b. The biasing member 82 biases the movable core 80 such that the poppet valve 74 is seated on the valve seat 92.

In the supply solenoid valve 14 configured as above, while the coil 84a is not powered (in a non-energized state), the poppet valve 74 is seated on the valve seat 92 by the biasing force of the biasing member 82 and closes the channel 90. On the other hand, when the coil 84a is powered, the coil 84a is energized, and the movable core 80 is attracted to the fixed core 78 by the energizing effect. This causes the movable core 80 to be displaced while sliding on the inner surface of the bobbin 84b. As a result, the poppet valve 74 is separated from the valve seat 92, and the channel 90 is opened.

The first exhaust solenoid valve 16 and the second exhaust solenoid valve 18 each have a structure similar to the structure of the supply solenoid valve 14. That is, the first exhaust solenoid valve 16 and the second exhaust solenoid valve 18 are solenoid valves having the same component structure as the supply solenoid valve 14 and are manufactured through the same manufacturing process. In other words, the first exhaust solenoid valve 16 and the second exhaust solenoid valve 18 each have a flow rate characteristic substantially identical to the flow rate characteristic of the supply solenoid valve 14.

The flow rate characteristics here are determined by formulas expressing pressure loss calculated using sonic conductance and critical pressure ratio (see JIS B8390). Moreover, the state where the valves have substantially identical flow rate characteristics refers to a condition in which the pressure losses of the flow rate characteristics of the first exhaust solenoid valve 16 and the second exhaust solenoid valve 18 range from 0.7 to 1.3 when the pressure loss of the flow rate characteristic of the supply solenoid valve 14 is 1.

Since the first exhaust solenoid valve 16 and the second exhaust solenoid valve 18 each include components similar to the components of the supply solenoid valve 14 as described above, detailed descriptions of the structures will be omitted.

Figure 3:
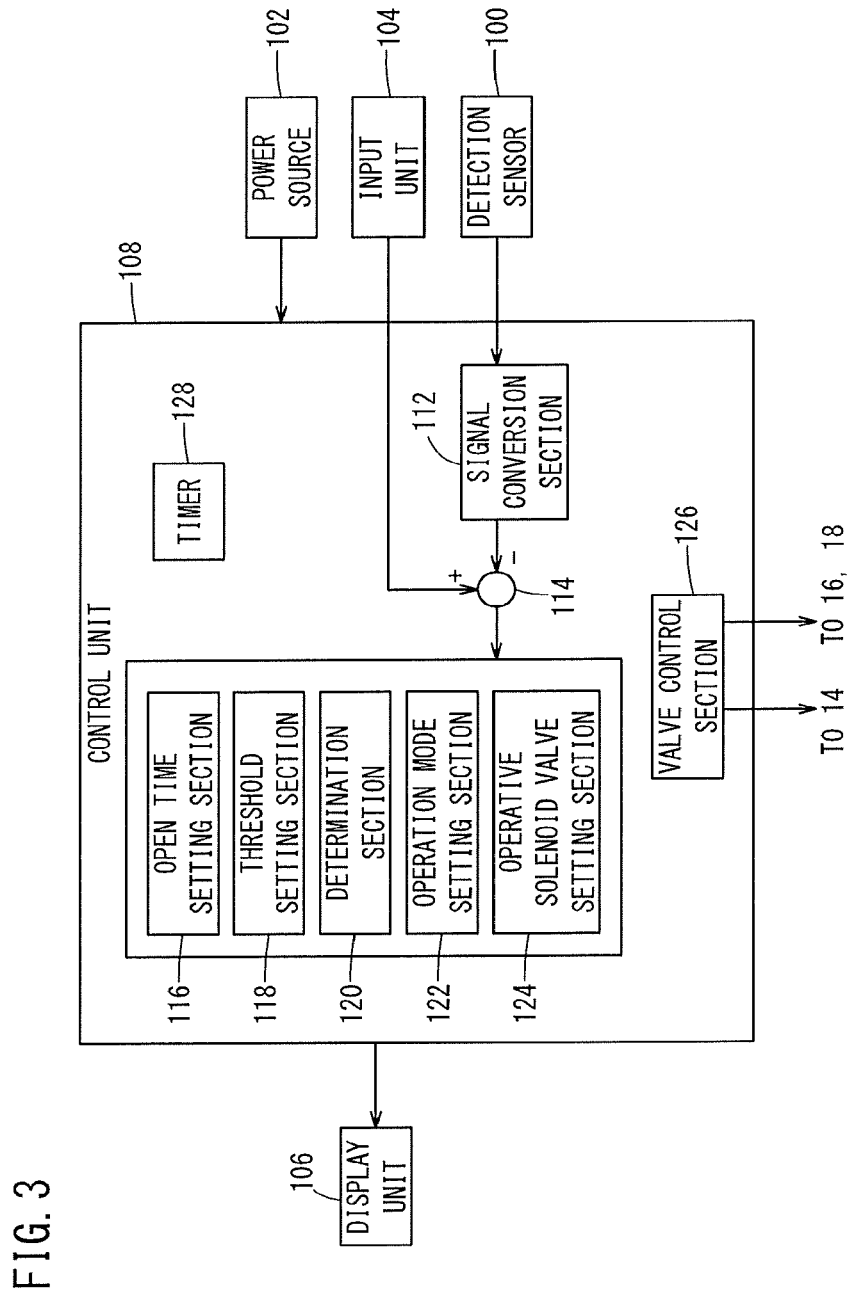
FIG. 3 is a block diagram of a control unit.

As illustrated in FIGS. 1 and 3, the solenoid valve system 10A further includes a detection sensor 100, a power source 102, an input unit 104, a display unit 106, and a control unit 108.

The detection sensor 100 is a pressure sensor detecting the pressure inside the middle channel 58 communicating with the outlet port 30 and the back pressure chamber 56. In other words, the detection sensor 100 detects the pressure generated on a downstream side of the outlet port 30 (pressure applied to the pneumatic device 302). The detection sensor 100 outputs a signal corresponding to the pressure applied to the pneumatic device 302 to the control unit 108. In this case, the solenoid valve system 10A controls the pressure of gas on the downstream side of the outlet port 30.

The detection sensor 100 is not limited to the pressure sensor. The detection sensor 100 may be a flow rate sensor detecting the flow rate at the outlet port 30. In this case, the solenoid valve system 10A controls the flow rate of gas exhausted to the downstream side of the outlet port 30.

The power source 102 supplies power to the control unit 108. The input unit 104 includes, for example, buttons for inputting a set value (set pressure) for the pneumatic device 302. The input unit 104 may be, for example, a touchscreen. The display unit 106 displays the set value (set pressure), measured values (pressure detected by the detection sensor 100), and other values.

The control unit 108 is a calculator including a microcomputer, and includes a central processing unit (CPU), a memory such as read-only memory (ROM) and random-access memory (RAM), and other components. The control unit 108 functions as various function performing units (function performing means) when the CPU reads out and executes programs stored in the ROM. The various function performing units may also be configured using function performing devices serving as hardware. As illustrated in FIG. 3, the control unit 108 includes a signal conversion section 112, a deviation calculation section 114, an open time setting section 116, a threshold setting section 118, a determination section 120, an operation mode setting section 122, an operative solenoid valve setting section 124, a valve control section 126, and a timer 128.

The signal conversion section 112 converts an analog signal from the detection sensor 100 into a digital signal (measured values). The deviation calculation section 114 calculates deviation of the measured values provided by the signal conversion section 112 from the indicated value (set value) provided by the input unit 104.

The open time setting section 116 sets an open time Ton of the supply solenoid valve 14 and the exhaust solenoid valves (the first exhaust solenoid valve 16 and the second exhaust solenoid valve 18) required to match the measured values to the set value.

Figure 11:
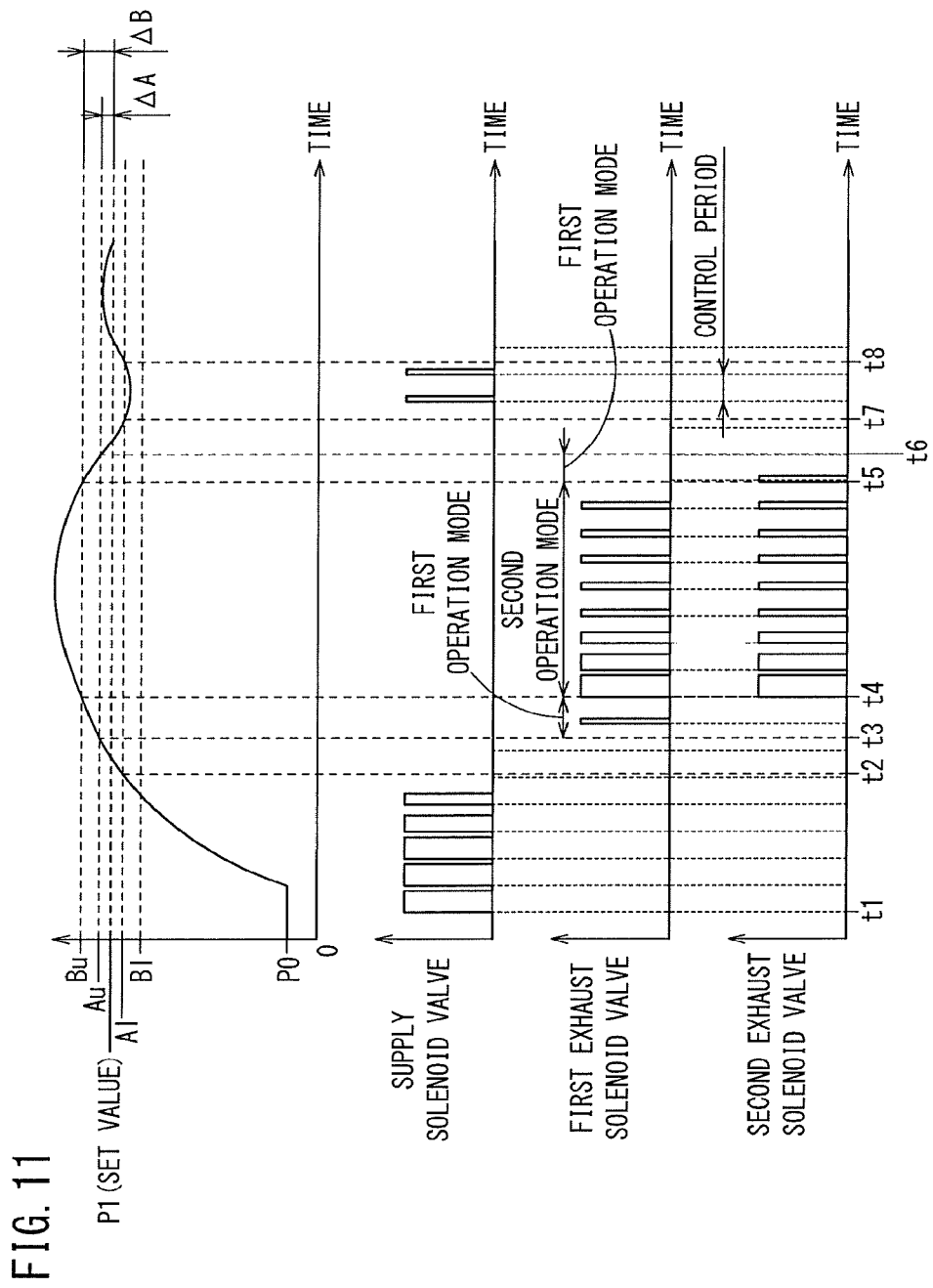
FIG. 11 is a timing chart of level increase control by the solenoid valve system in FIG. 1.

As illustrated in, for example, FIG. 11, the threshold setting section 118 sets a first upper threshold Au, a first lower threshold A1, a second upper threshold Bu, and a second lower threshold B1. The first upper threshold Au is greater than the set value by a first threshold range $\Delta A$. The first lower threshold A1 is less than the set value by the first threshold range $\Delta A$. The second upper threshold Bu is greater than the set value by a second threshold range $\Delta B$. The second lower threshold B1 is less than the set value by the second threshold range $\Delta B$.

The first threshold range $\Delta A$ is preferably set to less than 3% of the full-scale output value (maximum pressure value) of the solenoid valve system 10A, and more preferably, set to 1%. The second threshold range $\Delta B$ is preferably set between 3% and 7%, inclusive, of the full-scale output value (maximum pressure value) of the solenoid valve system 10A, and more preferably, set to 5%. In this case, the pressure on a downstream side of the solenoid valve system 10A (pressure applied to the pneumatic device 302) can be matched (approximated) precisely to the set value.

In FIG. 3, the determination section 120 compares the deviation calculated by the deviation calculation section 114 with the first threshold range $\Delta A$ and the second threshold range $\Delta B$ set at the threshold setting section 118. The determination section 120 determines whether time measured by the timer 128 has reached a predetermined period of time (control period, open time).

The operation mode setting section 122 sets either a first operation mode where the first exhaust solenoid valve 16 and the second exhaust solenoid valve 18 open one time (or multiple times) alternately or a second operation mode where the first exhaust solenoid valve 16 and the second exhaust solenoid valve 18 open simultaneously.

The operative solenoid valve setting section 124 sets the exhaust solenoid valve (the first exhaust solenoid valve 16 or the second exhaust solenoid valve 18) controlled with a control period in the first operation mode as an operative solenoid valve.

The valve control section 126 controls opening and closing operation of the supply solenoid valve 14, the first exhaust solenoid valve 16, and the second exhaust solenoid valve 18 using Pulse Width Modulation (PWM) control or Pulse Frequency Modulation (PFM) control.

Next, control performed by the solenoid valve system 10A will be described. As illustrated in FIG. 1, the supply solenoid valve 14, the first exhaust solenoid valve 16, and the second exhaust solenoid valve 18 are closed in an initial state. That is, in the initial state, the supply valve element 34 is seated on the supply valve seat 36, and the exhaust valve element 44 is seated on the exhaust valve seat 46.

Figure 4:
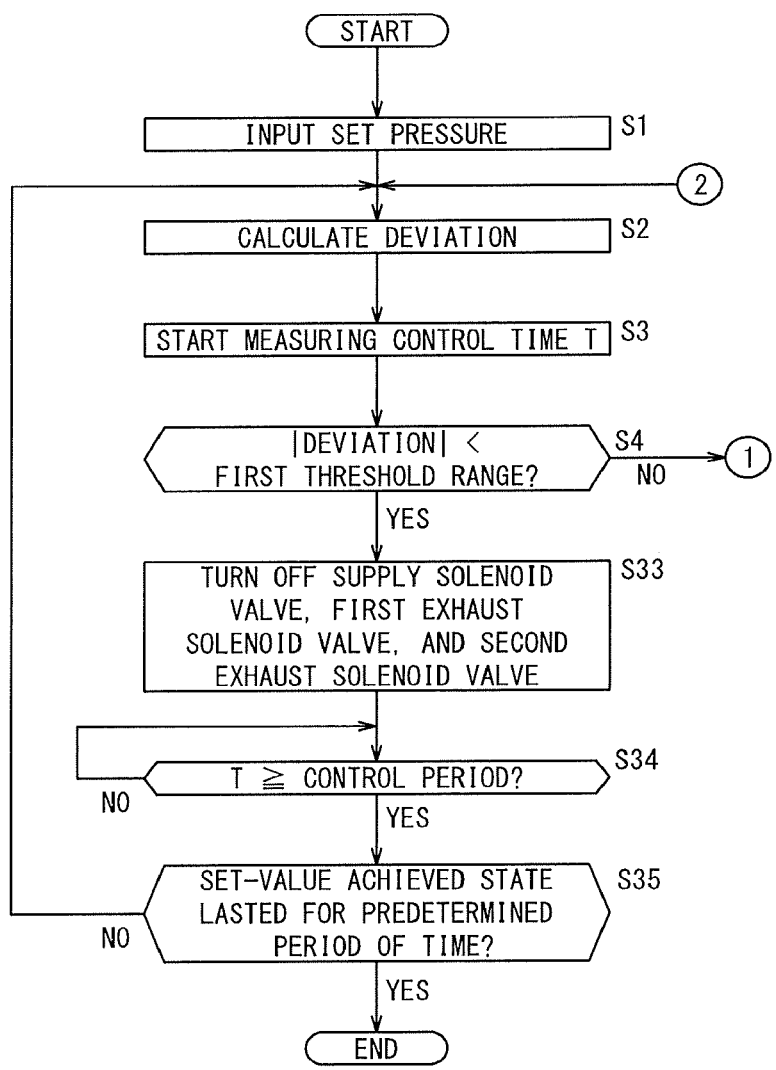
FIG. 4 is a first flowchart illustrating control by the solenoid valve system.

As illustrated in FIG. 4, in step S1, a user inputs a set pressure for the pneumatic device 302 to the input unit 104. Then, an input signal (set value) corresponding to the set pressure is input from the input unit 104 to the control unit 108. The detection sensor 100 detects the pressure at the outlet port 30 (the pneumatic device 302). The signal detected by the detection sensor 100 is output to the signal conversion section 112.

Next, in step S2, the deviation calculation section 114 calculates a deviation by subtracting a measured value (signal output from the signal conversion section 112) from the set value. Then, in step S3, the timer 128 starts measuring a control time T. Subsequently, in step S4, the determination section 120 determines whether the absolute value of the deviation is less than the first threshold range ΔA.

Figure 5:
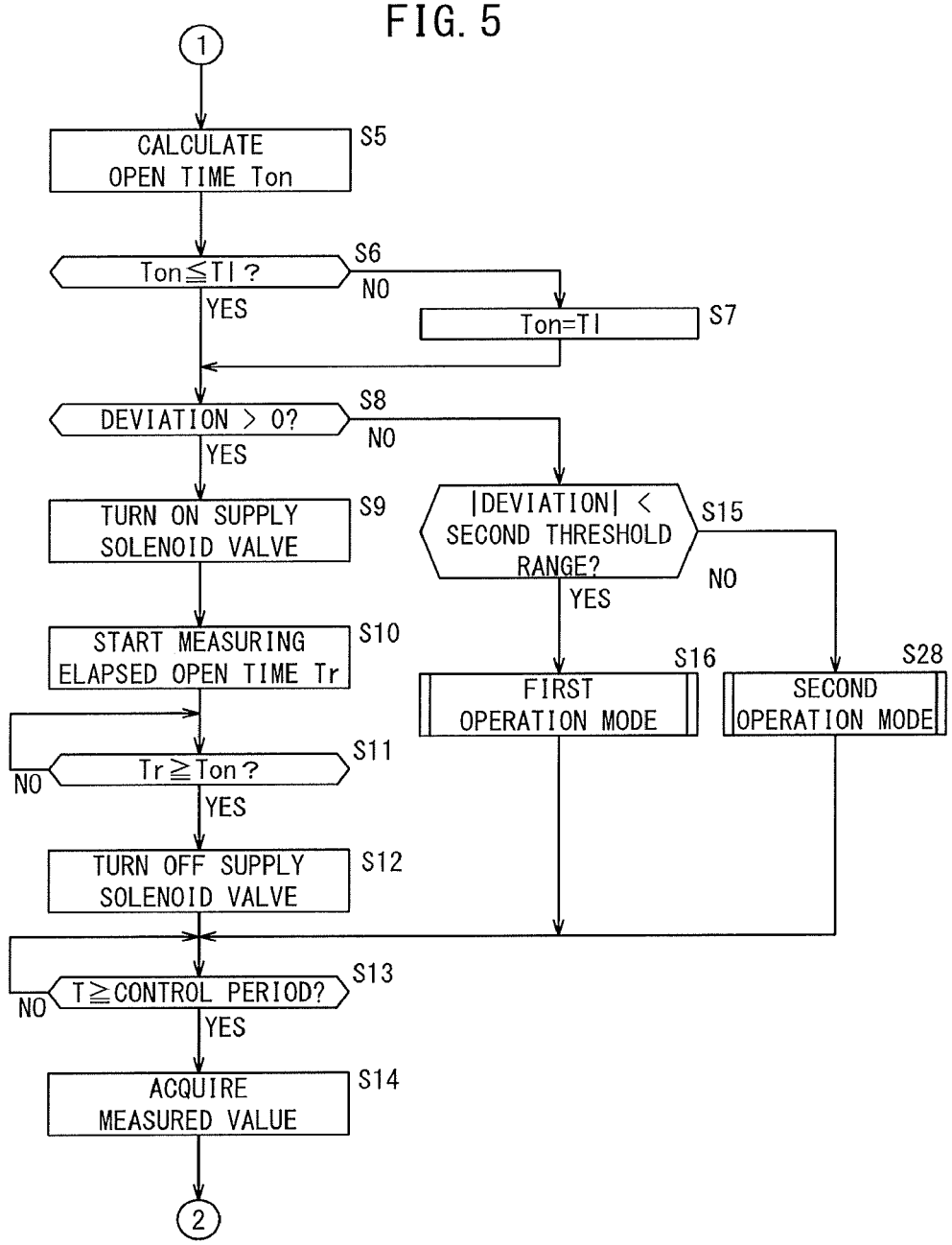
FIG. 5 is a second flowchart illustrating the control by the solenoid valve system.

If the absolute value of the deviation (difference between the set value and the measured value) is greater than or equal to the first threshold range ΔA (No in step S4), the open time setting section 116 calculates the open time Ton of the supply solenoid valve 14 or the exhaust solenoid valves (the first exhaust solenoid valve 16 and the second exhaust solenoid valve 18) required to match the pressure applied to the pneumatic device 302 to the set value in FIG. 5 (step S5).

At this moment, if the polarity of the deviation is positive (if the set value is greater than the measured value), the open time setting section 116 calculates the open time Ton of the supply solenoid valve 14. If the polarity of the deviation is negative (if the set value is less than the measured value), the open time setting section 116 calculates the open time Ton of the exhaust solenoid valves (the first exhaust solenoid valve 16 and the second exhaust solenoid valve 18).

Subsequently, in step S6, the open time setting section 116 determines whether the calculated open time Ton is less than or equal to a maximum open time T1 in the control period. If the open time Ton is greater than the maximum open time T1 (No in step S6), the open time setting section 116 sets the open time Ton to the maximum open time T1 in step S7. If the open time Ton is less than or equal to the maximum open time T1 (Yes in step S6), the open time setting section 116 uses the value calculated in step S5 as the open time Ton.

When the open time Ton is set, the determination section 120 determines whether the polarity of the deviation is positive in step S8. In other words, the determination section 120 determines which of the supply solenoid valve 14 and the exhaust solenoid valves (the first exhaust solenoid valve 16 and the second exhaust solenoid valve 18) should be controlled based on the polarity of the deviation. That is, if the polarity of the deviation is positive, the determination section 120 determines that the measured value is less than the set value and thus that the supply solenoid valve 14 should be controlled. On the other hand, if the polarity of the deviation is negative, the determination section 120 determines that the measured value is greater than the set value and thus that the exhaust solenoid valves (the first exhaust solenoid valve 16 and the second exhaust solenoid valve 18) should be controlled.

If the deviation is positive (Yes in step S8), the valve control section 126 outputs an ON signal (valve opening signal) to the supply solenoid valve 14 in step S9. This opens the supply solenoid valve 14.

Figure 8:
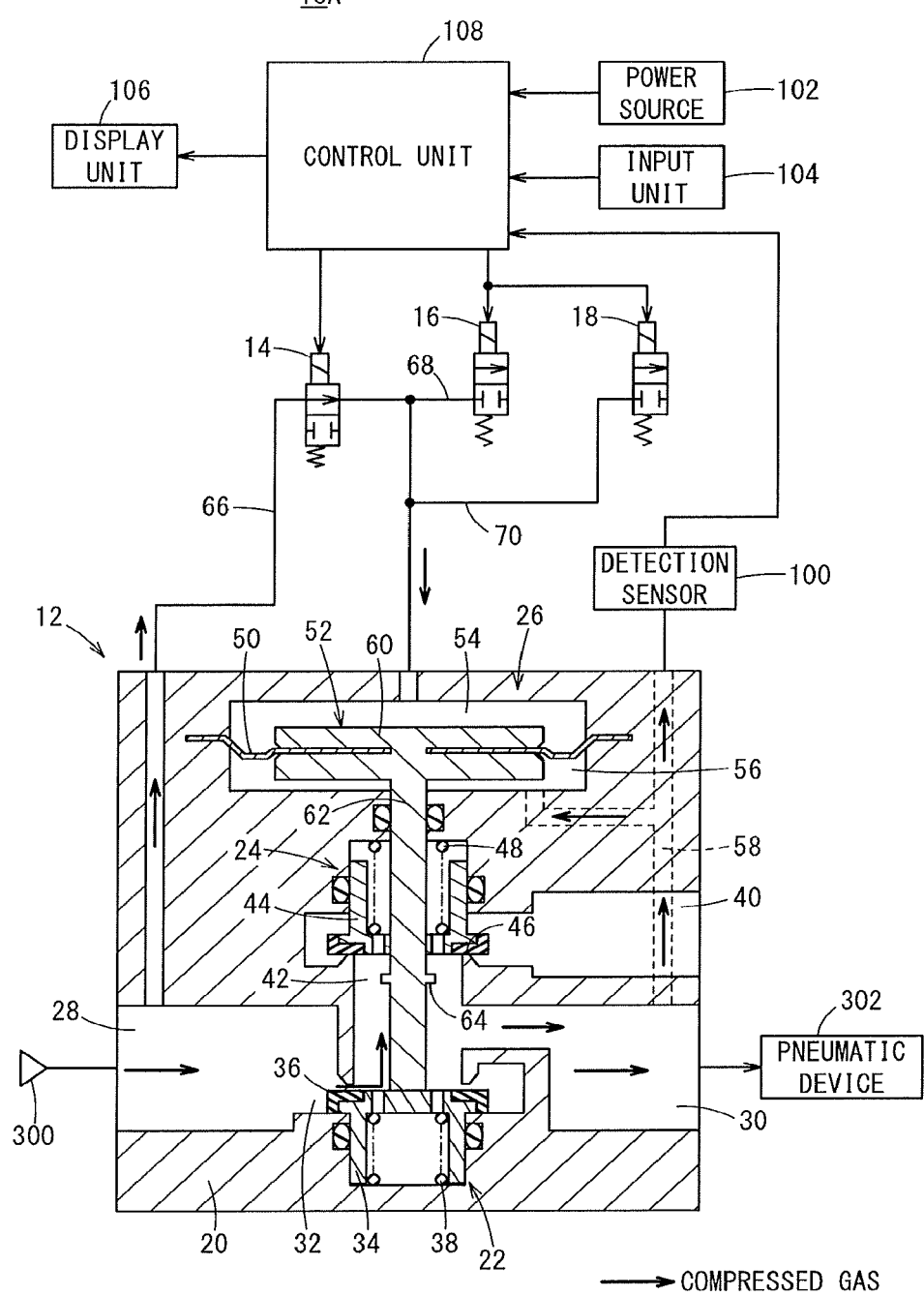
FIG. 8 illustrates a state where the supply solenoid valve, which is closed in FIG. 1, is open.

In FIG. 8, when the supply solenoid valve 14 opens, the communication channel 66 opens, and compressed gas in the inlet port 28 is guided into the pilot chamber 54 via the communication channel 66. This causes the pressure inside the pilot chamber 54 to increase. When the pressure inside the pilot chamber 54 is higher than the pressure inside the back pressure chamber 56, the diaphragm 50 is displaced toward the back pressure chamber 56. Thus, the rod 62 pushes the supply valve element 34 against the biasing force of the supply valve biasing member 38.

This opens the supply valve element 34 and thus opens the supply channel 32. Consequently, the compressed gas in the inlet port 28 flows into the outlet port 30 via the supply channel 32 and is guided to the pneumatic device 302, resulting in an increase in the measured value (pressure detected by the detection sensor 100). At this time, the exhaust valve element 44 is seated on the exhaust valve seat 46 by the biasing force of the exhaust valve biasing member 48.

At this moment, the compressed gas guided from the inlet port 28 to the outlet port 30 is guided to the back pressure chamber 56 via the middle channel 58. That is, the pressure inside the back pressure chamber 56 increases. The diaphragm 50 then operates such that a resultant force of the pressure inside the back pressure chamber 56 and the biasing force of the supply valve biasing member 38 are balanced with the pressure inside the pilot chamber 54.

As illustrated in FIG. 5, in step S10, the timer 128 starts measuring an elapsed open time Tr after the ON signal is output from the valve control section 126. Then, in step S11, the determination section 120 determines whether the elapsed open time Tr has reached the open time Ton. Step S11 is repeated until the elapsed open time Tr reaches the open time Ton (No in step S11).

When the elapsed open time Tr reaches the open time Ton (Yes in step S11), the valve control section 126 outputs an OFF signal (valve closing signal) to the supply solenoid valve 14 in step S12. This closes the supply solenoid valve 14.

Subsequently, in step S13, the determination section 120 determines whether the control time T has reached the control period. Step S13 is repeated until the control time T reaches the control period (No in step S13).

When the control time T reaches the control period (Yes in step S13), the control unit 108 acquires the measured value in step S14. That is, the control unit 108 detects the pressure using the detection sensor 100. Subsequently, the process returns to step S2 (see FIG. 4).

If the deviation is negative (No in step S8), the determination section 120 determines whether the absolute value of the deviation is less than the second threshold range ΔB in Step S15. If the absolute value of the deviation is less than the second threshold range ΔB (Yes in step S15), the operation mode setting section 122 sets the first operation mode where the first exhaust solenoid valve 16 and the second exhaust solenoid valve 18 open one time alternately in step S16.

Figure 6:
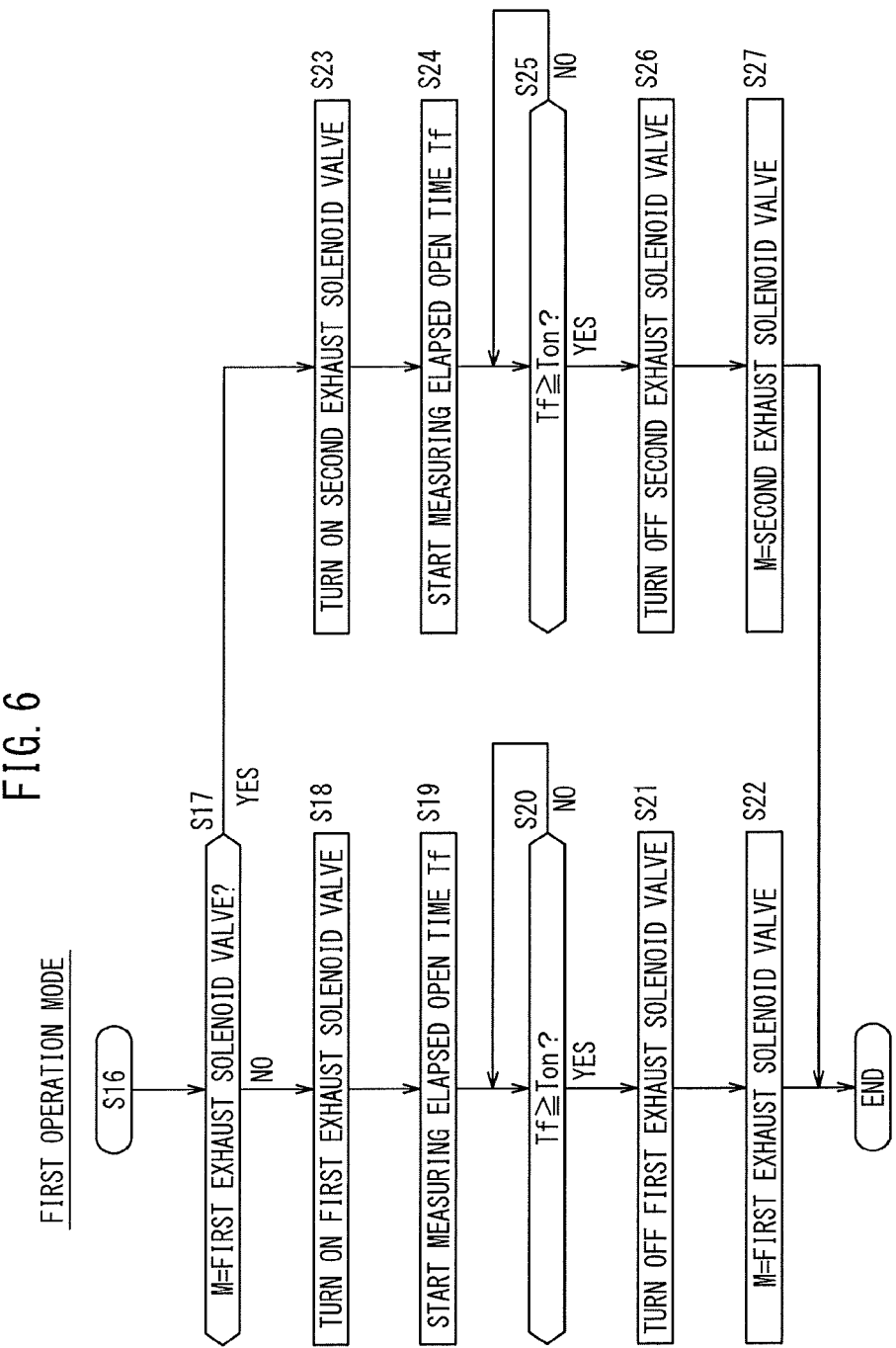
FIG. 6 is a third flowchart illustrating the control by the solenoid valve system.

That is, as illustrated in FIG. 6, in step S17, the determination section 120 determines whether an operative solenoid valve M set during the previous control period in the first operation mode is the first exhaust solenoid valve 16. In other words, the determination section 120 determines which of the first exhaust solenoid valve 16 and the second exhaust solenoid valve 18 should be controlled during the current control period. That is, the determination section 120 determines that the exhaust solenoid valve different from the exhaust solenoid valve operated during the previous control period in the first operation mode should be controlled during the current control period. An initial value of the operative solenoid valve M (an initial set value when neither the first exhaust solenoid valve 16 nor the second exhaust solenoid valve 18 is operated) is set to the second exhaust solenoid valve 18.

If the operative solenoid valve M set during the previous control period in the first operation mode is not the first exhaust solenoid valve 16 (if the operative solenoid valve M is the second exhaust solenoid valve 18; No in step S17), the valve control section 126 outputs the ON signal (valve opening signal) to the first exhaust solenoid valve 16 in step S18. This opens the first exhaust solenoid valve 16. At this moment, the second exhaust solenoid valve 18 is closed.

Figure 9:
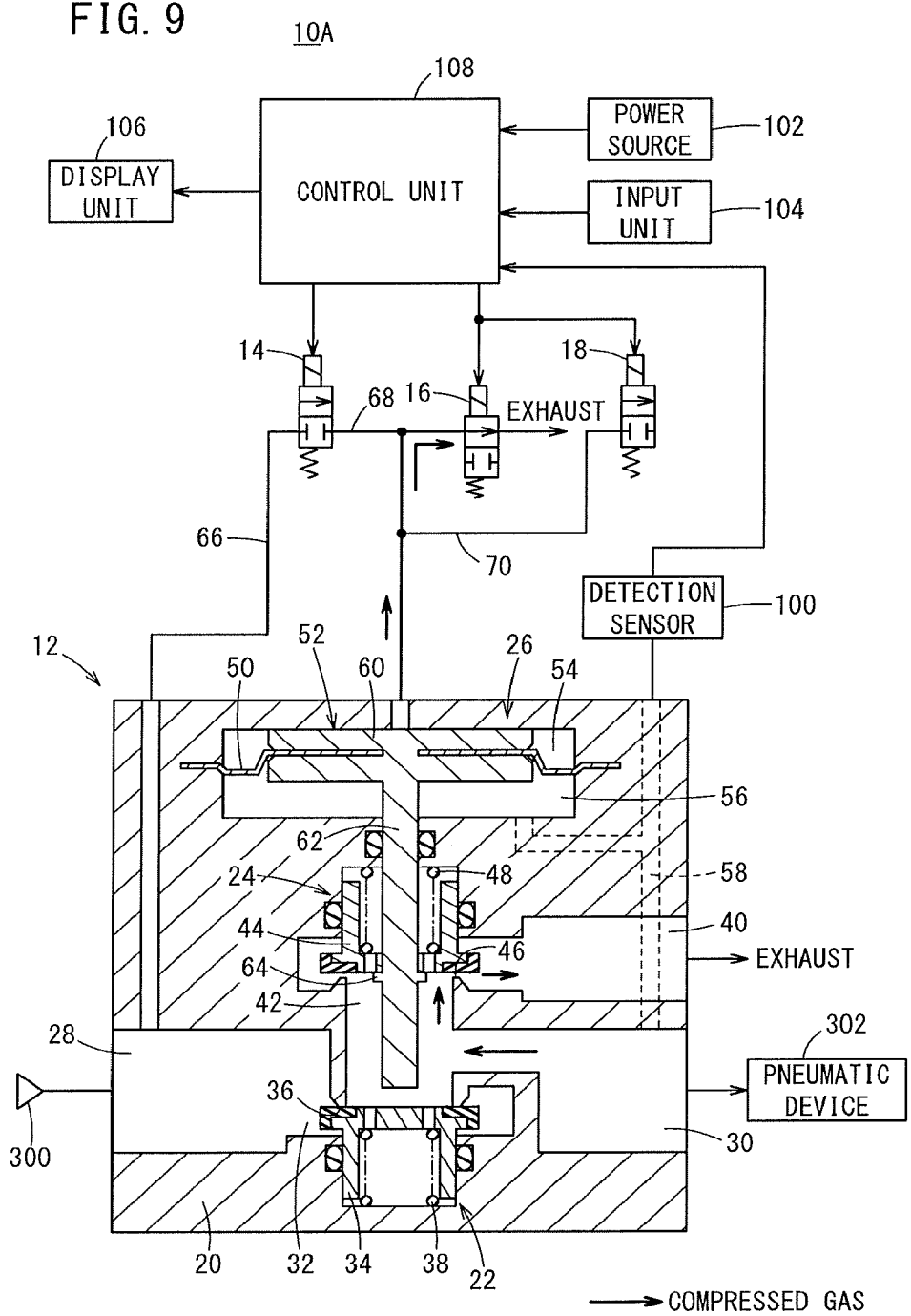
FIG. 9 illustrates a state where the first exhaust solenoid valve, which is closed in FIG. 1, is open.

In FIG. 9, when the first exhaust solenoid valve 16 opens, compressed gas inside the pilot chamber 54 is exhausted to the outside through the first release channel 68, resulting in a reduction in the pressure inside the pilot chamber 54.

When the pressure inside the pilot chamber 54 is lower than the pressure inside the back pressure chamber 56, the diaphragm 50 is displaced toward the pilot chamber 54. Thus, the engagement protrusion 64 provided for the rod 62 pushes the exhaust valve element 44 against the biasing force of the exhaust valve biasing member 48. This opens the exhaust valve element 44 and thus opens the exhaust channel 42. As a result, the measured value (pressure detected by the detection sensor 100) decreases. At this time, the supply valve element 34 is seated on the supply valve seat 36 by the biasing force of the supply valve biasing member 38.

At this moment, the compressed gas inside the back pressure chamber 56 is guided to the exhaust port 40 via the middle channel 58, the outlet port 30, and the exhaust channel 42. That is, the pressure inside the back pressure chamber 56 decreases. The diaphragm 50 then operates such that a resultant force of the pressure inside the pilot chamber 54 and the biasing force of the exhaust valve biasing member 48 are balanced with the pressure inside the back pressure chamber 56.

As illustrated in FIG. 6, in step S19, the timer 128 starts measuring an elapsed open time Tf after the ON signal is output from the valve control section 126. Then, in step S20, the determination section 120 determines whether the elapsed open time Tf has reached the open time Ton. Step S20 is repeated until the elapsed open time Tf reaches the open time Ton (No in step S20).

When the elapsed open time Tf reaches the open time Ton (Yes in step S20), the valve control section 126 outputs the OFF signal (valve closing signal) to the first exhaust solenoid valve 16 in step S21. This closes the first exhaust solenoid valve 16. In step S22, the operative solenoid valve setting section 124 sets the operative solenoid valve M controlled during the current control period in the first operation mode to the first exhaust solenoid valve 16. Subsequently, as illustrated in FIGS. 4 and 5, the process from step S13 is performed.

As illustrated in FIG. 6, in step S17, if the operative solenoid valve M set during the previous control period in the first operation mode is the first exhaust solenoid valve 16 (Yes in step S17), the valve control section 126 outputs the ON signal (valve opening signal) to the second exhaust solenoid valve 18 in step S23. This opens the second exhaust solenoid valve 18. At this moment, the first exhaust solenoid valve 16 is closed. The solenoid valve system 10A at this time operates similarly to the operation when the above-described first exhaust solenoid valve 16 is opened.

In step S24, the timer 128 starts measuring the elapsed open time Tf after the ON signal is output from the valve control section 126. Then, in step S25, the determination section 120 determines whether the elapsed open time Tf has reached the open time Ton. Step S25 is repeated until the elapsed open time Tf reaches the open time Ton (No in step S25).

When the elapsed open time Tf reaches the open time Ton (Yes in step S25), the valve control section 126 outputs the OFF signal (valve closing signal) to the second exhaust solenoid valve 18 in step S26. This closes the second exhaust solenoid valve 18. In step S27, the operative solenoid valve setting section 124 sets the operative solenoid valve M controlled during the current control period in the first operation mode to the second exhaust solenoid valve 18. Subsequently, as illustrated in FIGS. 4 and 5, the process from step S13 is performed.

As illustrated in FIG. 5, in step S15, if the absolute value of the deviation is greater than or equal to the second threshold range ΔB (No in step S15), the operation mode setting section 122 sets the second operation mode where the first exhaust solenoid valve 16 and the second exhaust solenoid valve 18 open simultaneously in step S28.

Figure 7:
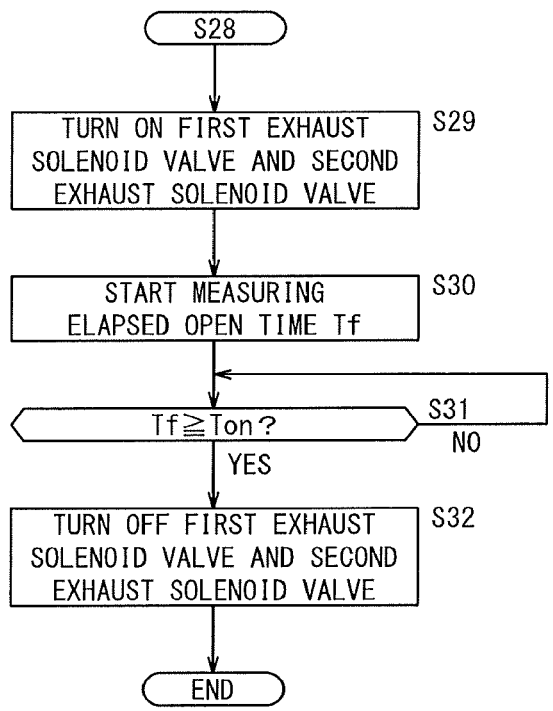
FIG. 7 is a fourth flowchart illustrating the control by the solenoid valve system.

That is, as illustrated in FIG. 7, the valve control section 126 outputs the ON signal (valve opening signal) to both the first exhaust solenoid valve 16 and the second exhaust solenoid valve 18 simultaneously in step S29. This opens the first exhaust solenoid valve 16 and the second exhaust solenoid valve 18 simultaneously.

Figure 10:
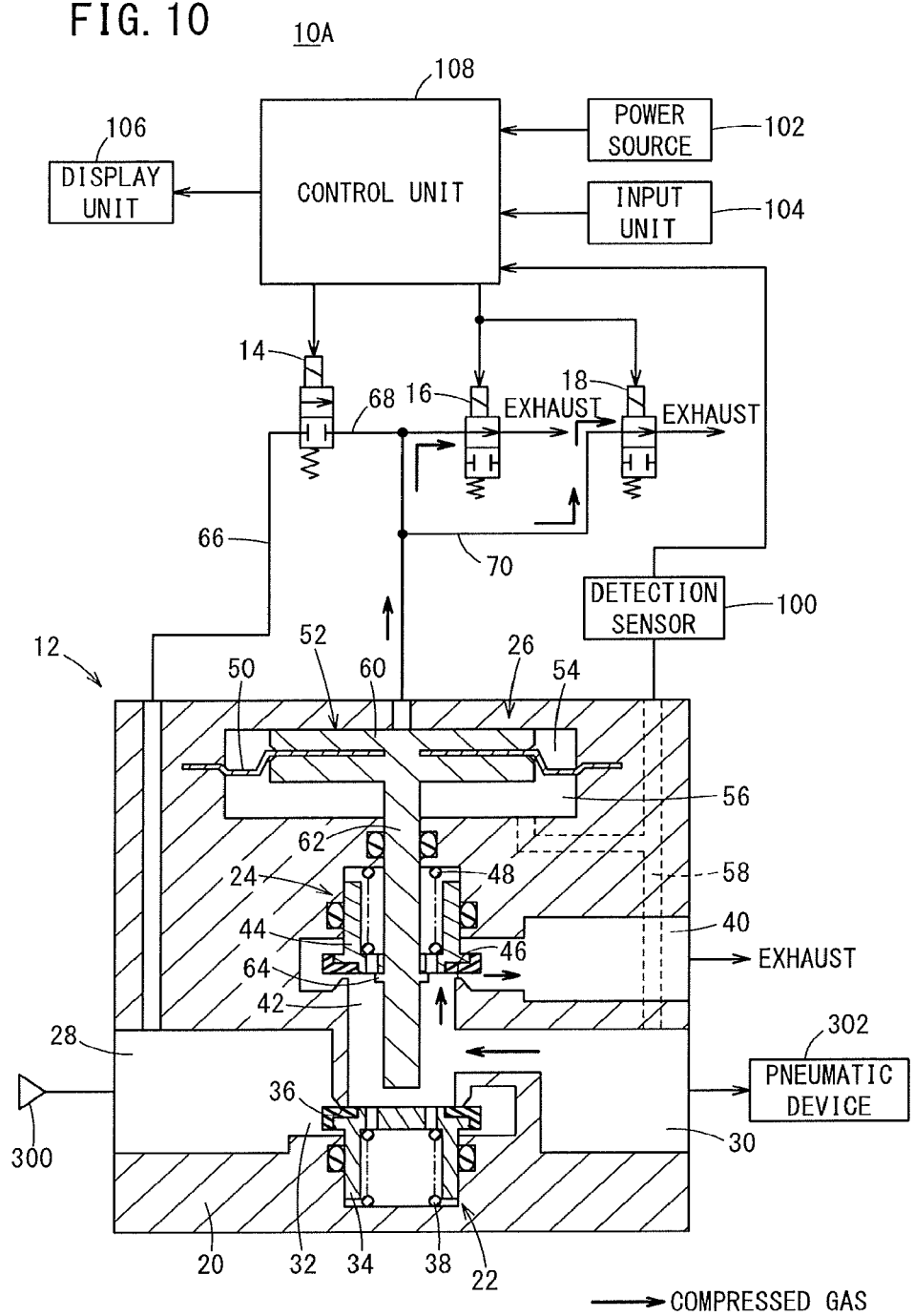
FIG. 10 illustrates a state where the first exhaust solenoid valve and the second exhaust solenoid valve, which are closed in FIG. 1, are open.

As illustrated in FIG. 10, when both the first exhaust solenoid valve 16 and the second exhaust solenoid valve 18 open, compressed gas inside the pilot chamber 54 is exhausted to the outside through both the first release channel 68 and the second release channel 70, resulting in a reduction in the pressure inside the pilot chamber 54. In this case, the valve unit 12 operates similarly to when the first exhaust solenoid valve 16 opens, and the measured value output from the signal conversion section 112 (pressure detected by the detection sensor 100) decreases.

As illustrated in FIG. 7, in step S30, the timer 128 starts measuring the elapsed open time Tf after the ON signal is output from the valve control section 126. Then, in step S31, the determination section 120 determines whether the elapsed open time Tf has reached the open time Ton. Step S31 is repeated until the elapsed open time Tf reaches the open time Ton (No in step S31).

When the elapsed open time Tf reaches the open time Ton (Yes in step S31), the valve control section 126 outputs the OFF signal (valve closing signal) to both the first exhaust solenoid valve 16 and the second exhaust solenoid valve 18 simultaneously in step S32. This closes the first exhaust solenoid valve 16 and the second exhaust solenoid valve 18. Subsequently, as illustrated in FIGS. 4 and 5, the process from step S13 is performed.

As illustrated in FIG. 4, if the absolute value of the deviation is less than the first threshold range ΔA in step S4 (Yes in step S4), the valve control section 126 outputs the OFF signal (valve closing signal) to the supply solenoid valve 14, the first exhaust solenoid valve 16, and the second exhaust solenoid valve 18 in step S33. Subsequently, in step S34, the determination section 120 determines whether the control time T has reached the control period. Step S34 is repeated until the control time T reaches the control period (No in step S34). When the control time T reaches the control period (Yes in step S34), the control unit 108 determines whether a state where the absolute value of the deviation is less than the first threshold range ΔA (set-value achieved state) has lasted for a predetermined period of time in step S35.

If the set-value achieved state has not lasted for the predetermined period of time (No in step S35), the process is repeated from step S2. If the set-value achieved state has lasted for the predetermined period of time (Yes in step S35), the series of operation flows ends.

In the above-described control performed by the solenoid valve system 10A, the first exhaust solenoid valve 16 and the second exhaust solenoid valve 18 open one time alternately in the first operation mode. However, the valve control section 126 may control the opening and closing operation such that the first exhaust solenoid valve 16 and the second exhaust solenoid valve 18 open plural times alternately in the first operation mode.

Next, level increase control to increase the pressure applied to the pneumatic device 302 from an initial value P0 to a set value P1 using the solenoid valve system 10A (control illustrated in FIG. 11) will be described. That is, in the level increase control, the user inputs the set pressure corresponding to the set value P1 to the input unit 104 (step S1 in FIG. 4).

In the level increase control, step S2 in the flowchart illustrated in FIGS. 4 to 7 is started at a time point t1 in FIG. 11. That is, as illustrated in FIG. 4, the deviation calculation section 114 calculates the deviation by subtracting the measured value from the set value at the time point t1 (step S2). Then, in step S3, the timer 128 starts measuring the control time T.

Subsequently, in step S4, the determination section 120 determines that the absolute value of the deviation is greater than the first threshold range ΔA (No in step S4). Since the polarity of the deviation is positive in this case, as illustrated in FIG. 5, the open time setting section 116 calculates the open time Ton of the supply solenoid valve 14 required to match the measured value to the set value in step S5. At the time point t1, the open time Ton is greater than the maximum open time T1 in the control period (No in step S6). Thus, the open time setting section 116 sets the open time Ton to the maximum open time T1 in the control period (step S7).

Then, the determination section 120 determines that the polarity of the deviation is positive (Yes in step S8). Thus, the valve control section 126 opens the supply solenoid valve 14 for the open time Ton and then closes the valve (see steps S9 to S12 and FIG. 8). As illustrated in FIG. 11, the opening control to open the supply solenoid valve 14 is repeated (see steps S2 to S14 in FIGS. 4 and 5). This increases the measured value.

At a time point t2, the measured value increases to the first lower threshold A1. Then, as illustrated in FIG. 4, the determination section 120 determines that the absolute value of the deviation is less than the first threshold range ΔA (Yes in step S4).

In step S33, the valve control section 126 outputs the OFF signal to the supply solenoid valve 14, the first exhaust solenoid valve 16, and the second exhaust solenoid valve 18. Subsequently, when the control time T reaches the control period (Yes in step S34), the control unit 108 determines whether the set-value achieved state has lasted for a predetermined period of time (step S35). Since the set-value achieved state has not lasted for the predetermined period of time (No in step S35), the process is repeated from step S2.

At a time point t3 in FIG. 11, the measured value increases to the first upper threshold Au. Then, in FIG. 4, the determination section 120 determines that the absolute value of the deviation is greater than or equal to the first threshold range ΔA (No in step S4).

Since the polarity of the deviation is negative in this case, in FIG. 5, the open time setting section 116 calculates the open time Ton of the exhaust solenoid valves (the first exhaust solenoid valve 16 and the second exhaust solenoid valve 18) required to match the measured value to the set value. Here, since the open time Ton is less than or equal to the maximum open time T1 in the control period (Yes in step S6), the open time setting section 116 uses the value calculated in step S5 as the open time Ton.

Then, the determination section 120 determines that the polarity of the deviation is negative (No in step S8) and that the absolute value of the deviation is less than the second threshold range ΔB (Yes in step S15). Thus, the operation mode setting section 122 sets the first operation mode in step S16.

In FIG. 6, if the determination section 120 determines that the second exhaust solenoid valve 18 is set as the operative solenoid valve M during the previous control period in the first operation mode (No in step S17), the valve control section 126 opens the first exhaust solenoid valve 16 for the predetermined open time Ton and then closes the valve (see steps S18 to S21 and FIG. 9). This reduces the pressure at the outlet port 30 (the pneumatic device 302). Subsequently, in step S22, the operative solenoid valve setting section 124 sets the operative solenoid valve M to the first exhaust solenoid valve 16.

At a time point t4 in FIG. 11, the measured value increases to the second upper threshold Bu. Then, in FIG. 5, the determination section 120 determines that the absolute value of the deviation is greater than or equal to the second threshold range ΔB (No in step S15). Thus, the operation mode setting section 122 sets the second operation mode in step S28.

Consequently, as illustrated in FIG. 7, the valve control section 126 opens the first exhaust solenoid valve 16 and the second exhaust solenoid valve 18 simultaneously for the predetermined open time Ton and then closes the valves simultaneously (see steps S29 to S32 and FIG. 10). This reduces the pressure at the outlet port 30 (the pneumatic device 302).

At a time point t5 in FIG. 11, the measured value decreases to the second upper threshold Bu. Then, in FIG. 5, the determination section 120 determines that the absolute value of the deviation is less than the second threshold range ΔB (Yes in step S15). Thus, the operation mode setting section 122 sets the first operation mode in step S16.

As illustrated in FIG. 6, since the determination section 120 determines that the first exhaust solenoid valve 16 is set as the operative solenoid valve M (Yes in step S17), the valve control section 126 opens the second exhaust solenoid valve 18 for the predetermined open time Ton and then closes the valve (see steps S23 to S26). This reduces the pressure at the outlet port 30 (the pneumatic device 302). Subsequently, in step S27, the operative solenoid valve setting section 124 sets the operative solenoid valve M to the second exhaust solenoid valve 18.

At a time point t6 in FIG. 11, the measured value decreases to the first upper threshold Au. Then, in FIG. 4, the determination section 120 determines that the absolute value of the deviation is less than the first threshold range ΔA (Yes in step S4). In this case, the process from step S33 to step S35 is performed. Since the set-value achieved state has not lasted for the predetermined period of time at this moment (No in step S35), the process is repeated from step S2.

At a time point t7 in FIG. 11, the measured value decreases to the first lower threshold A1. Then, in FIG. 4, the determination section 120 determines that the absolute value of the deviation is greater than or equal to the first threshold range ΔA (No in step S4). Then, in FIG. 5, the determination section 120 determines that the polarity of the deviation is positive (Yes in step S8). Thus, the valve control section 126 opens the supply solenoid valve 14 for the predetermined open time Ton and then closes the valve (see steps S9 to S12 and FIG. 8).

At a time point t8 in FIG. 11, the measured value increases to the first lower threshold A1. Then, in FIG. 4, the determination section 120 determines that the absolute value of the deviation is less than the first threshold range ΔA (Yes in step S4). In this case, the process from step S33 to step S35 in FIG. 4 is performed. Here, since the set-value achieved state lasts for the predetermined period of time (Yes in step S35), the process of level increase control is complete.

Next, level reduction control to lower the pressure applied to the pneumatic device 302 from an initial value P2 to a set value P3 using the solenoid valve system 10A (control illustrated in FIG. 12) will be described. That is, in the level reduction control, the user inputs the set pressure corresponding to the set value P3 to the input unit 104 (step S1).

Figure 12:
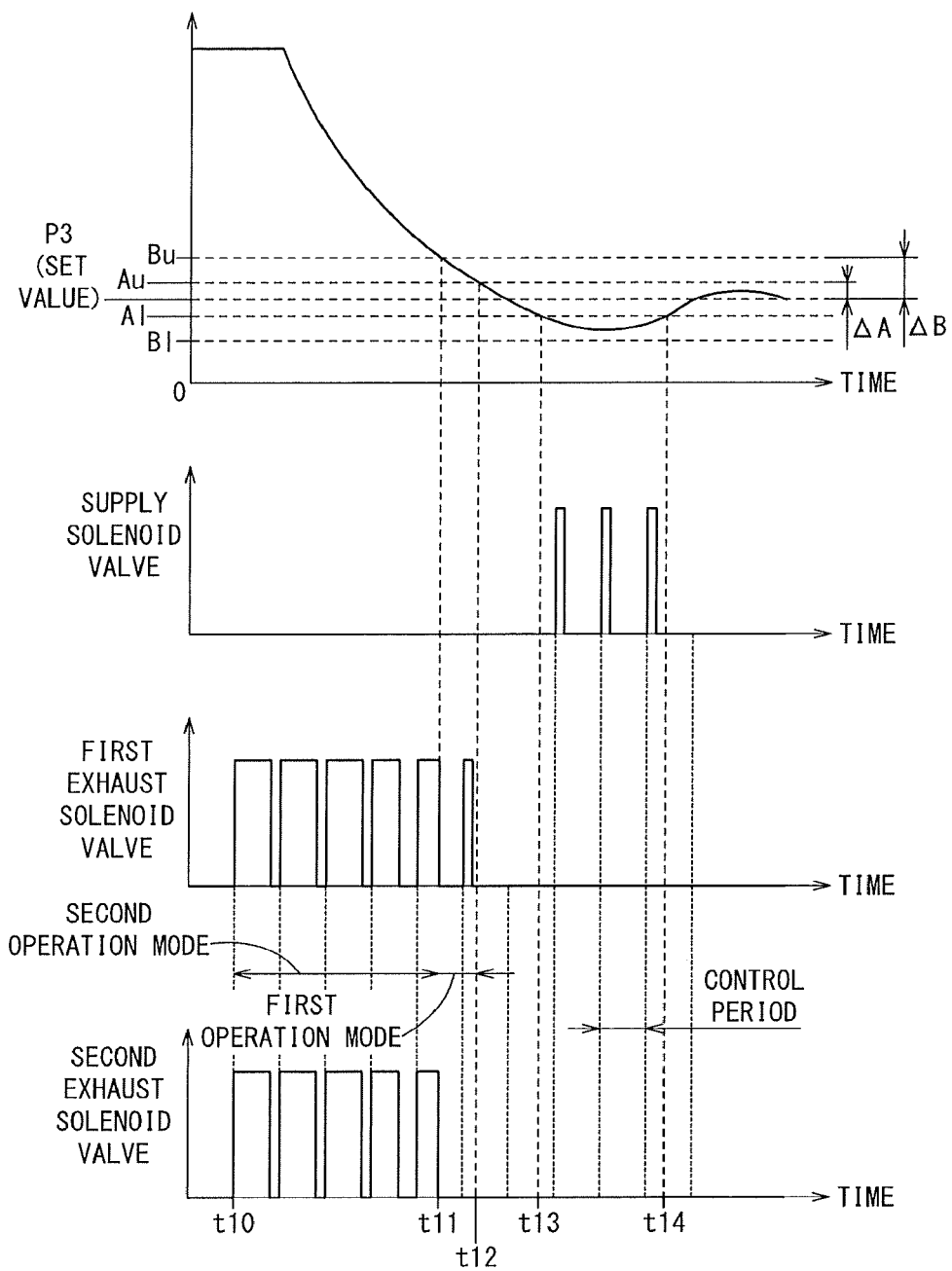
FIG. 12 is a timing chart of level reduction control by the solenoid valve system in FIG. 1.

In the level reduction control, step S2 in the flowchart illustrated in FIG. 4 is started at a time point t10 in FIG. 12. That is, as illustrated in FIG. 4, the deviation calculation section 114 calculates the deviation by subtracting the measured value from the set value at the time point t10 (step S2). Then, in step S3, the timer 128 starts measuring the control time T.

Subsequently, in step S4, the determination section 120 determines that the absolute value of the deviation is greater than the first threshold range ΔA (No in step S4). Since the polarity of the deviation is negative in this case, as illustrated in FIG. 5, the open time setting section 116 calculates the open time Ton of the exhaust solenoid valves (the first exhaust solenoid valve 16 and the second exhaust solenoid valve 18) required to match the measured value to the set value in step S5. At the time point t10, the open time Ton is greater than the maximum open time T1 in the control period (No in step S6). Thus, the open time setting section 116 sets the open time Ton to the maximum open time T1 in the control period (step S7).

Then, the determination section 120 determines that the polarity of the deviation is negative (No in step S8) and that the absolute value of the deviation is greater than the second threshold range ΔB (No in step S15). Thus, the operation mode setting section 122 sets the second operation mode in step S28.

That is, as illustrated in FIG. 7, the valve control section 126 opens the first exhaust solenoid valve 16 and the second exhaust solenoid valve 18 simultaneously for the predetermined open time Ton and then closes the valves simultaneously (see steps S29 to S32 and FIG. 10). This reduces the pressure at the outlet port 30 (the pneumatic device 302).

At a time point t11 in FIG. 12, the measured value decreases to the second upper threshold Bu. Then, as illustrated in FIG. 5, the determination section 120 determines that the absolute value of the deviation is less than the second threshold range ΔB (Yes in step S15). Thus, the operation mode setting section 122 sets the first operation mode in step S16.

In FIG. 6, if the determination section 120 determines that the second exhaust solenoid valve 18 is set as the operative solenoid valve M during the previous control period in the first operation mode (No in step S17), the valve control section 126 opens the first exhaust solenoid valve 16 for the predetermined open time Ton and then closes the valve (see steps S18 to S21 and FIG. 8). This reduces the pressure at the outlet port 30 (the pneumatic device 302). Subsequently, in step S22, the operative solenoid valve setting section 124 sets the operative solenoid valve M to the first exhaust solenoid valve 16.

At a time point t12 in FIG. 12, the measured value decreases to the first upper threshold Au. Then, in FIG. 4, the determination section 120 determines that the absolute value of the deviation is less than the first threshold range ΔA (Yes in step S4). In this case, the process from step S33 to step S35 in FIG. 4 is performed. Since the set-value achieved state has not lasted for the predetermined period of time at this moment (No in step S35), the process is repeated from step S2.

At a time point t13 in FIG. 12, the measured value decreases to the first lower threshold A1. Then, as illustrated in FIG. 5, the determination section 120 determines that the absolute value of the deviation is greater than or equal to the first threshold range ΔA (No in step S4) and that the deviation is positive (Yes in step S8). Thus, the valve control section 126 opens the supply solenoid valve 14 for the predetermined open time Ton and then closes the valve (see steps S9 to S12 and FIG. 8).

At a time point t14 in FIG. 12, the measured value increases to the first lower threshold A1. Then, as illustrated in FIG. 4, the determination section 120 determines that the absolute value of the deviation is less than the first threshold range ΔA (Yes in step S4). In this case, the process from step S33 to step S35 in FIG. 4 is performed. Here, since the set-value achieved state lasts for the predetermined period of time (Yes in step S35), the process of level reduction control is complete.

The solenoid valve system 10A according to this embodiment produces the following effects.

The solenoid valve system 10A includes the supply solenoid valve 14 configured to control the flow rate of gas supplied to the pilot chamber 54 of the pilot valve portion 26, the plurality of exhaust solenoid valves (the first exhaust solenoid valve 16 and the second exhaust solenoid valve 18) configured to control the flow rate of gas exhausted from the pilot chamber 54, and the valve control section 126 configured to control the opening and closing operation of the supply solenoid valve 14 and the plurality of exhaust solenoid valves (the first exhaust solenoid valve 16 and the second exhaust solenoid valve 18) using PWM or PFM control. The plurality of exhaust solenoid valves (the first exhaust solenoid valve 16 and the second exhaust solenoid valve 18) are disposed in parallel with each other, and the supply solenoid valve 14 and the plurality of exhaust solenoid valves (the first exhaust solenoid valve 16 and the second exhaust solenoid valve 18) have substantially identical flow rate characteristics. The number of the plurality of exhaust solenoid valves (the first exhaust solenoid valve 16 and the second exhaust solenoid valve 18) is twice the number of the supply solenoid valve 14.

According to the structure, the supply solenoid valve 14 and the plurality of exhaust solenoid valves (the first exhaust solenoid valve 16 and the second exhaust solenoid valve 18) have substantially identical flow rate characteristics. This enhances the common use of parts and thus leads to a reduction in the cost of the solenoid valve system 10A.

Since the number of the plurality of exhaust solenoid valves (the first exhaust solenoid valve 16 and the second exhaust solenoid valve 18) is twice the number of the supply solenoid valve 14, the number of times the exhaust solenoid valves (the first exhaust solenoid valve 16 and the second exhaust solenoid valve 18) are operated can be efficiently reduced. This reduces difference in life (caused by wear occurring when the poppet valve 74 is seated on the valve seat 92 or wear occurring while the movable core 80 slides on the inner surface of the bobbin 84b) between the exhaust solenoid valves (the first exhaust solenoid valve 16 and the second exhaust solenoid valve 18) and the supply solenoid valve 14, and thus extends the life of the solenoid valve system 10A.

The solenoid valve system 10A includes the operation mode setting section 122 configured to set either the first operation mode where the plurality of exhaust solenoid valves (the first exhaust solenoid valve 16 and the second exhaust solenoid valve 18) open one time alternately or plural times alternately, or the second operation mode where the plurality of exhaust solenoid valves (the first exhaust solenoid valve 16 and the second exhaust solenoid valve 18) open simultaneously. The valve control section 126 is configured to control the opening and closing operation of the plurality of exhaust solenoid valves (the first exhaust solenoid valve 16 and the second exhaust solenoid valve 18) based on the operation mode set by the operation mode setting section 122.

According to the structure, the first operation mode where the plurality of exhaust solenoid valves (the first exhaust solenoid valve 16 and the second exhaust solenoid valve 18) open one time or multiple times alternately enables the minimum open time of the exhaust solenoid valves in the control period to be equal to the minimum open time of the supply solenoid valve 14. Consequently, the number of times the exhaust solenoid valves (the first exhaust solenoid valve 16 and the second exhaust solenoid valve 18) are operated can be efficiently reduced while the resolution at which the pressure inside the pilot chamber 54 is controlled is prevented from decreasing. In addition, the second operation mode where the plurality of exhaust solenoid valves (the first exhaust solenoid valve 16 and the second exhaust solenoid valve 18) open simultaneously prevents the velocity at which the pressure inside the pilot chamber 54 decreases (level reduction response time) from slowing down.

The solenoid valve system 10A includes the detection sensor 100 configured to detect the pressure or flow rate of gas at the outlet port 30. The operation mode setting section 122 sets the first operation mode when the absolute value of the deviation of the measured value obtained by the detection sensor 100 from the set value is less than a predetermined threshold, and sets the second operation mode when the absolute value of the deviation is greater than or equal to the predetermined threshold.

According to the structure, the first operation mode is performed when the absolute value of the deviation is less than the threshold (second threshold range ΔB; when the difference between the measured value and the set value is relatively small). As a result, the measured value (pressure on the downstream side of the outlet port 30) can be matched (approximated) precisely to the set value. On the other hand, the second operation mode is performed when the absolute value of the deviation is greater than or equal to the threshold (second threshold range ΔB; when the difference between the measured value and the set value is relatively large). As a result, the measured value (pressure on the downstream side of the outlet port 30) can be efficiently reduced.

When the valve control section 126 controls the opening and closing operation of the plurality of exhaust solenoid valves (the first exhaust solenoid valve 16 and the second exhaust solenoid valve 18), the operation mode setting section 122 sets either the first operation mode or the second operation mode every control period of the valve control section 126.

According to the structure, the measured value (pressure on the downstream side of the outlet port 30) can be efficiently and precisely approximated to the set value.

When the operation mode setting section 122 sets the first operation mode, the valve control section 126 controls the opening and closing operation of the plurality of exhaust solenoid valves (the first exhaust solenoid valve 16 and the second exhaust solenoid valve 18) in a manner that the plurality of exhaust solenoid valves (the first exhaust solenoid valve 16 and the second exhaust solenoid valve 18) open one time alternately.

According to the structure, the plurality of exhaust solenoid valves (the first exhaust solenoid valve 16 and the second exhaust solenoid valve 18) can be operated in a balanced manner.

When the operation mode setting section 122 sets the first operation mode, the valve control section 126 controls the opening and closing operation of the exhaust solenoid valve different from the exhaust solenoid valve operated during the previous control period.

According to the structure, the plurality of exhaust solenoid valves (the first exhaust solenoid valve 16 and the second exhaust solenoid valve 18) can be operated in a balanced manner.

Second Embodiment

Next, a solenoid valve system 10B according to a second embodiment of the present invention will be described. In this embodiment, the same reference numerals and symbols are used for components identical to those in the first embodiment, and the detailed descriptions will be omitted.

As illustrated in FIG. 13, the solenoid valve system 10B includes a valve unit 200 instead of the valve unit 12. The valve unit 200 includes a valve body 201, the supply valve portion 22, and a pilot valve portion 202. The valve body 201 has the supply channel 32 that places the inlet port 28 and the outlet port 30 in communication.

The pilot valve portion 202 is configured to operate the supply valve element 34, and is disposed in the valve body 201. The pilot valve portion 202 includes the diaphragm 50 partitioning a predetermined space formed in the valve body 201 into the pilot chamber 54 and the back pressure chamber 56, and the valve element operating part 52 attached to the diaphragm 50. The valve element operating part 52 includes the secured part 60 secured to the central part of the diaphragm 50 and the rod 62 extending from the secured part 60 to the supply valve portion 22.

The outlet port 30 is provided with a throttle portion 204. The throttle portion 204 is a ring-shaped portion protruding inward from the inner surface forming the outlet port 30 and serves as an orifice. The valve body 201 has a communication path 206 that places a part of the supply channel 32 between the supply valve portion 22 and the throttle portion 204, and the back pressure chamber 56 in communication.

The solenoid valve system 10B includes a detection sensor 210 detecting the pressure in a first channel 208 communicating with the back pressure chamber 56 and a detection sensor 214 detecting the pressure in a second channel 212 communicating with a part of the supply channel 32 on a downstream side of the throttle portion 204. The detection sensors 210 and 214 are pressure sensors.

The solenoid valve system 10B detects the pressure on the upstream side of the throttle portion 204 and the pressure on the downstream side of the throttle portion 204 using the detection sensors 210 and 214, respectively. The opening and closing operation of the supply solenoid valve 14, the first exhaust solenoid valve 16, and the second exhaust solenoid valve 18 is controlled such that the flow rate of gas exhausted downstream of the outlet port 30 matches the set value by calculating the flow rate from the difference in pressure.

In this case, the flow rate of gas exhausted downstream of the outlet port 30 and the generated pressure can be measured simultaneously. Thus, either the pressure or flow rate can be selected as an object to be controlled by the solenoid valve system 10B.

This embodiment produces advantageous effects similar to those of the solenoid valve system 10A according to the first embodiment.

In this embodiment, a differential pressure sensor detecting the difference in pressure between an upstream side and a downstream side of the throttle portion 204 and a pressure sensor for pressure correction may be used instead of the two detection sensors 210 and 214.

The present invention is not limited to the above-described structures. The present invention is not limited to the example including one supply solenoid valve 14 and two exhaust solenoid valves, and may have any other structures including the plurality of the exhaust solenoid valves of which number is twice the number of the supply solenoid valves. That is, in a case where two supply solenoid valves 14 are provided, four exhaust solenoid valves may be provided accordingly.

The solenoid valve system according to the present invention is not limited in particular to the embodiments described above, and may have various structures without departing from the scope of the present invention as a matter of course.

What is claimed is:

1. A solenoid valve system including a supply valve element opening and closing a supply channel that places an inlet port and an outlet port in communication, and a pilot valve portion configured to operate the supply valve element, the system comprising:
    a supply solenoid valve configured to control a flow rate of gas supplied to a pilot chamber of the pilot valve portion;
    a plurality of exhaust solenoid valves configured to control a flow rate of gas exhausted from the pilot chamber;
    a valve control section configured to control opening and closing operation of the supply solenoid valve and the plurality of exhaust solenoid valves using PWM or PFM control; and
    an operation mode setting section configured to select either a first operation mode where the plurality of exhaust solenoid valves open one time alternately or plural times alternately, or a second operation mode where the plurality of exhaust solenoid valves open simultaneously,
    wherein the plurality of exhaust solenoid valves are disposed in parallel with each other,
    the supply solenoid valve and the plurality of exhaust solenoid valves have substantially identical flow rate characteristics,
    a number of the plurality of exhaust solenoid valves is twice a number of the supply solenoid valve, and
    the valve control section is configured to control the opening and closing operation of the plurality of exhaust solenoid valves based on the operation mode selected by the operation mode setting section.

2. The solenoid valve system according to claim 1, further comprising:
    a detection sensor configured to detect a pressure or a flow rate of gas at the outlet port,
    wherein the operation mode setting section selects the first operation mode when an absolute value of a deviation of a measured value obtained by the detection sensor from a set value is less than a predetermined threshold, and
    the operation mode setting section selects the second operation mode when the absolute value of the deviation is greater than or equal to the predetermined threshold.

3. The solenoid valve system according to claim 1, wherein, when the valve control section controls the opening and closing operation of the plurality of exhaust solenoid valves, the operation mode setting section selects either the first operation mode or the second operation mode every control period of the valve control section.

4. The solenoid valve system according to claim 3, wherein, when the operation mode setting section selects the first operation mode, the valve control section controls the opening and closing operation of the plurality of exhaust solenoid valves in a manner that the plurality of exhaust solenoid valves open one time alternately.

5. The solenoid valve system according to claim 4, wherein, when the operation mode setting section selects the first operation mode, the valve control section controls the opening and closing operation of the exhaust solenoid valve different from the exhaust solenoid valve operated during a previous control period.

* * * * *